United States Patent
Yamada et al.

(10) Patent No.: US 6,713,198 B2
(45) Date of Patent: Mar. 30, 2004

(54) CERAMIC LAMINATED ARTICLE, A METHOD OF PRODUCING THE SAME AND A CERAMIC LAMINATE

(75) Inventors: Hirotake Yamada, Anjyo (JP); Toshio Oda, Nishikasugai-gun (JP); Hiromichi Kobayashi, Yokkaichi (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/252,482

(22) Filed: Sep. 23, 2002

(65) Prior Publication Data

US 2003/0072930 A1 Apr. 17, 2003

(30) Foreign Application Priority Data

Oct. 11, 2001 (JP) .................................. P2001-313782
Jul. 8, 2002 (JP) .................................. P2002-199004

(51) Int. Cl.$^7$ .............................................. G01N 21/00
(52) U.S. Cl. ........................ 428/698; 428/210; 428/209; 428/195; 428/901
(58) Field of Search ................................. 428/698, 210, 428/195, 209, 901

(56) References Cited

U.S. PATENT DOCUMENTS 5,597,644 A * 1/1997 Araki et al. ................. 428/210

FOREIGN PATENT DOCUMENTS

| JP | 02-279575 | * 11/1990 | ............ C04B/41/80 |
| JP | 04-2211890 | * 8/1992 | ............ H05K/3/46 |
| JP | 07-272831 | * 10/1995 | ............ H05B/3/14 |
| JP | 2002/016354 | * 1/2002 | ............ H05K/3/40 |

* cited by examiner

Primary Examiner—Deborah Jones
Assistant Examiner—Vivek Koppikar
(74) Attorney, Agent, or Firm—Burr & Brown

(57) ABSTRACT

The present invention provides a ceramic structure for improving the resistance against a corrosive substance and to diffuse and supply a fluid over a larger area of the structure. A ceramic laminated article has a ceramic sintered body, and a ceramic film provided on the sintered body by means of chemical vapor deposition. A hollow surrounded by the sintered body and film, and holes in communication with the hollow and the outside are formed in the article. A filling material is filled in the recess of the sintered body and the holes are formed. The thus obtained assembly is heat treated to dissipate and remove the filling material through the communicating holes, so that the recess is left as the hollow.

10 Claims, 8 Drawing Sheets

Fig. 5
(a)
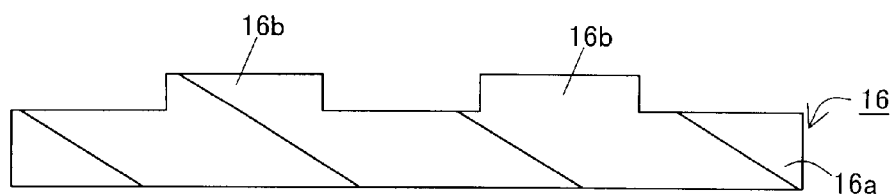
(b)
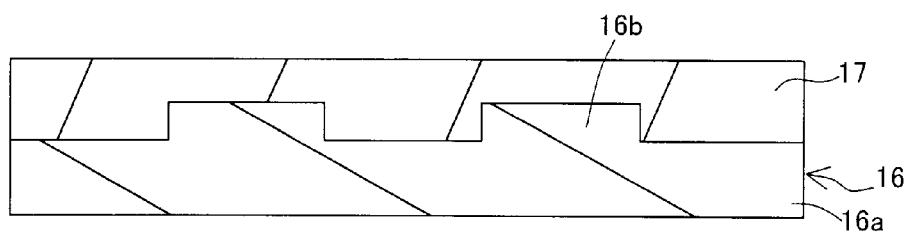
(c)
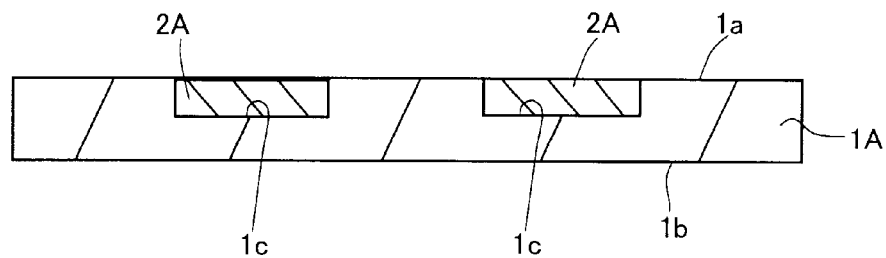

Fig. 6
(a)
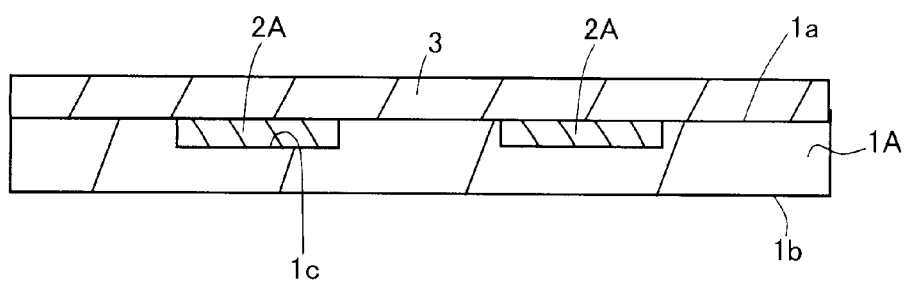
(b)
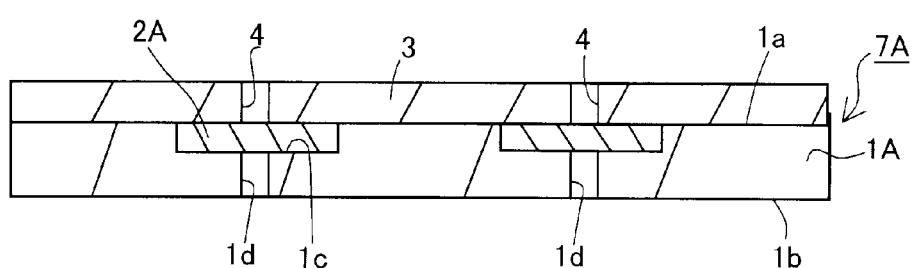
(c)
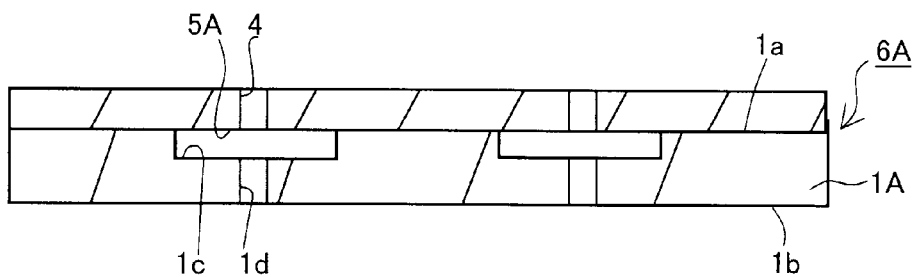

Fig. 7
(a)
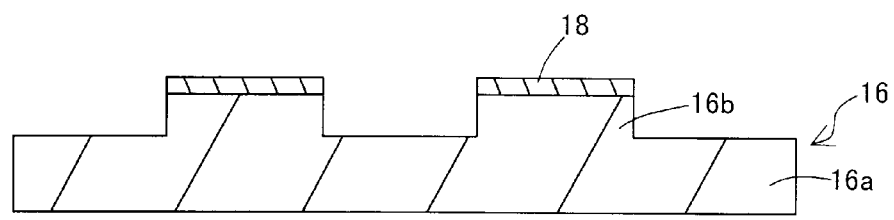
(b)
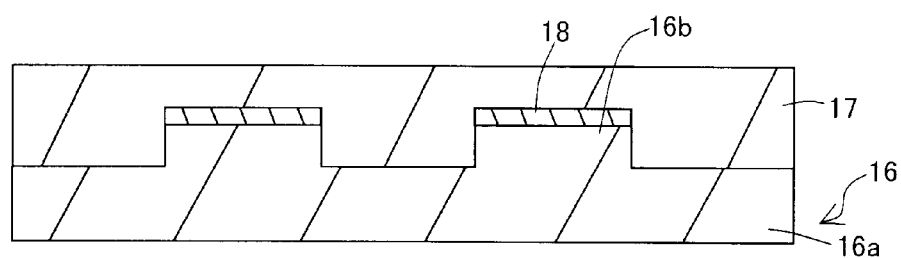
(c)
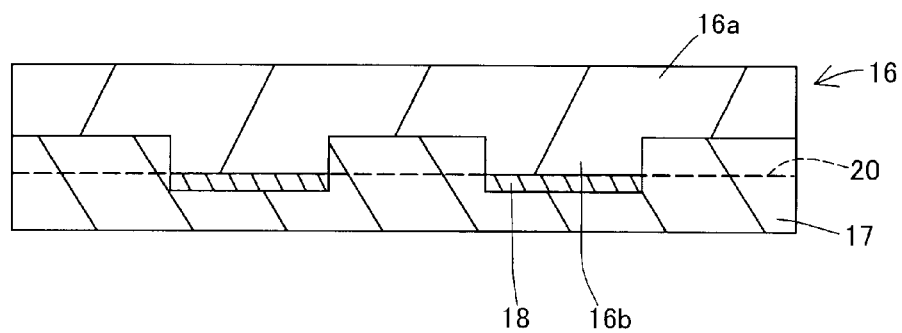

Fig. 8
(a) 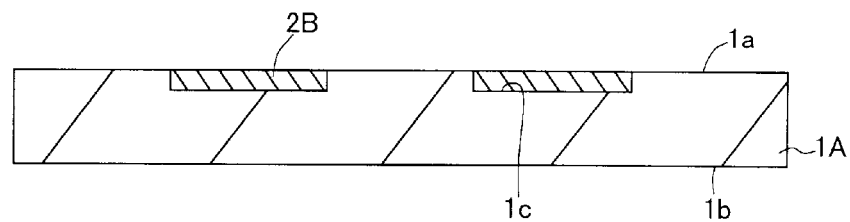
(b) 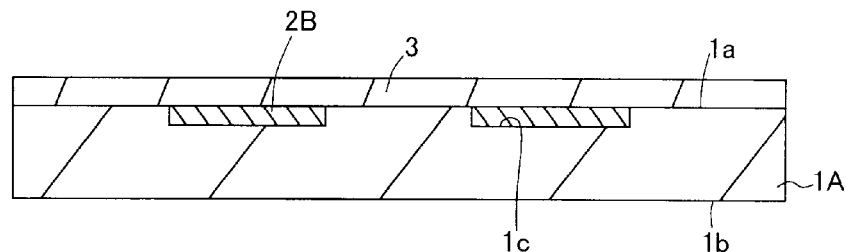
(c) 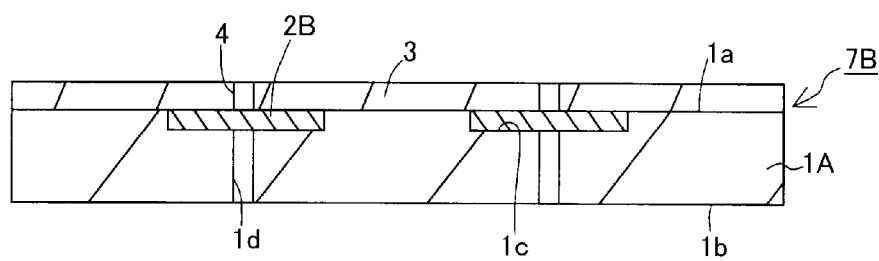
(d) 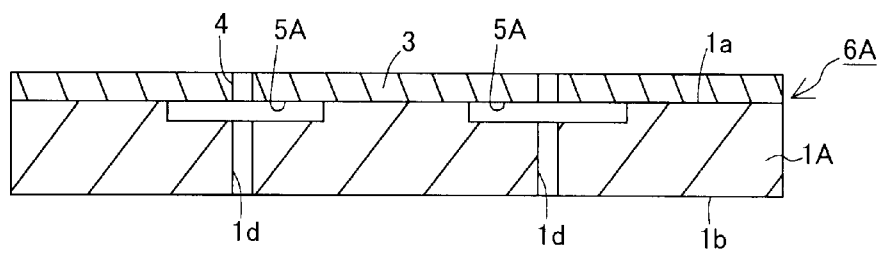

CERAMIC LAMINATED ARTICLE, A METHOD OF PRODUCING THE SAME AND A CERAMIC LAMINATE

This application claims the benefit of Japanese Patent Applications P2001-313782 filed Oct. 11, 2001, and P2002-199004 filed Jul. 8, 2002, the entireties of which are incorporated herein by reference.

BACKGROUND OF THE INVENTION

1. Field of the Invention

The invention relates to a ceramic laminated article, a method of producing the same and a ceramic laminate.

2. Related Art Statement

A corrosive gas at a high temperature is discharged from a reaction system for performing chemical vapor deposition (CVD) process. It is necessary to discharge the corrosive gas from the system only after the gas is diluted and cooled. Thus, a discharge gas tube that is anti-corrosive against such corrosive gas at a high temperature is needed.

The inventors have investigated various kinds of materials, however, and finally found few materials that are resistive against the corrosive gas at a high temperature flowing in the discharge tube. They have therefore investigated a technique for lining the inner wall surface of the discharge tube with a CVD film such as a silicon carbide film. They have tried to give the discharge tube an anti-corrosion property against the corrosive gas at a high temperature flowing therein by forming the film.

The inventors further investigated the technique and encountered the following problems. That is, a corrosive gas flowing through the discharge tube has a high temperature. It is therefore desired to reduce the temperature during a shorter time period to prevent the corrosion of the film formed on the inner wall surface of the discharge tube. However, as the flow rate of the gas flowing through the discharge tube is large, it becomes difficult to remove a sufficient amount of heat from the corrosive gas by means of thermal exchange with the atmosphere outside of the discharge tube. The corrosion rate of the film may thereby be accelerated. It is thus necessary to diffuse or supply a cooling fluid over a large area of the discharge tube, so as to improve the efficiency of thermal exchange between the corrosive gas and the fluid. Furthermore, in a planar member having a large surface area, such as a cooling trap having a large bottom surface, anti-corrosion property and efficient thermal exchange are needed. In other words, it is necessary to supply a cooling medium into a hollow formed under a film to preserve the anti-corrosion property of the cooling trap and improve the efficiency of the trap of aggregations.

SUMMARY OF THE INVENTION

An object of the present invention is to provide a ceramic structure for improving endurance against a corrosive substance and to diffuse and supply a fluid over a larger area of the structure.

Another object of the present invention is to provide a novel process of producing a structure having a ceramic film by means of chemical vapor deposition.

The present invention provides a ceramic laminated article comprising a ceramic sintered body and a ceramic film formed on the sintered body by chemical vapor deposition. A hollow is defined by the sintered body and ceramic film, and a hole in communication with the hollow and the outside space of the article is formed in the article.

The present invention further provides a method of producing a ceramic laminated article. According to the method, a laminate is prepared having a ceramic sintered body with a recess formed therein, a filling material filled in the recess and a ceramic film is formed on the sintered body so as to cover the filling material. The ceramic film is formed by chemical vapor deposition in the laminate, and a hole in communication with the recess and with the outside is formed in the laminate. The laminate is subjected to a heat treatment to dissipate the filling material through the hole.

The present invention further provides a ceramic laminated article obtained by the above method.

The present invention further provides a ceramic laminate having a ceramic sintered body with a recess formed therein, a filling material filled in the recess and a ceramic film formed on the sintered body so as to cover the filling material. The ceramic film is formed by chemical vapor deposition. The laminate has a hole communicating with the recess and with the outside formed therein.

These and other objects, features and advantages of the invention will be appreciated upon reading the following description of the invention when taken in conjunction with the attached drawings, with the understanding that some modifications, variations and changes of the same could be made by a skilled person in the art.

BRIEF DESCRIPTION OF THE DRAWINGS

FIG. 5(a) is a cross sectional view schematically showing a shaped body 16 made of a filling material.

FIG. 5(b) is a cross sectional view schematically showing the shaped body 16 and ceramic powder 17.

FIG. 5(c) is a cross sectional view schematically showing a ceramic sintered body 1A and filling material 2A.

FIG. 6(a) is a cross sectional view schematically showing the sintered body 1A, the filling material 2A and a ceramic film 3.

FIG. 6(b) is a cross sectional view schematically showing a laminate 7A.

FIG. 6(c) is a cross sectional view schematically showing a ceramic laminated article 6A.

FIG. 7(a) is a cross sectional view schematically showing a shaped body 16 of a filling material and a ring-shaped filling material 18.

FIG. 7(b) is a cross sectional view schematically showing a sintered body 17 integrated with the filling materials 16 and 18.

FIG. 7(c) shows broken lines 20 along which the shaped body 17 is cut.

FIG. 8(a) is a cross sectional view schematically showing a sintered body 1A and a filling material 2B filled in a recess.

FIG. 8(b) is a cross sectional view schematically showing the sintered body 1A, the filling material 2B and a film 3.

FIG. 8(c) is a cross sectional view schematically showing a laminate 7B.

FIG. 8(d) is a cross sectional view schematically showing a ceramic laminated article 6A.

DETAILED DESCRIPTION OF THE INVENTION

The present invention will be further described, referring to the attached drawings.

Figure 1:
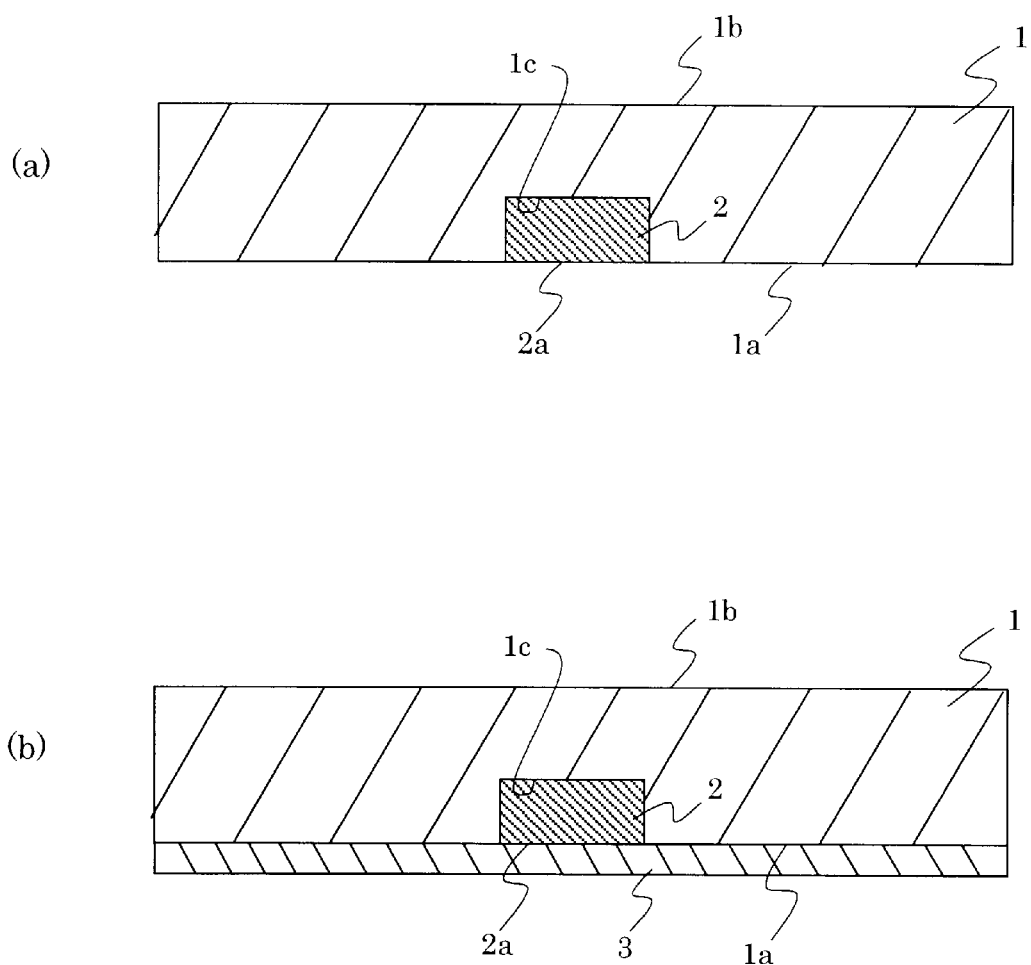
FIG. 1(a) is a cross sectional view schematically showing a ceramic sintered body 1 having a recess 1c formed therein and a filling material 2 filled in the recess.
FIG. 1(b) is a cross sectional view schematically showing the sintered body 1, a filling material 2, and a ceramic film 3 formed on a film-forming surface 1a and an exposed surface 2a of the filling material 2.

As shown in FIG. 1(a), a ceramic sintered body 1, for example having a shape of a plate, is prepared. A recess 1c is formed on a film-forming surface 1a of the sintered body 1. A film is not to be formed on the opposite surface 1b. A filling material 2 is then filled in the recess 1c. The film-forming surface 1a of the sintered body 1 and an exposed surface 2a of the filling material 2 together form a substantially flat and smooth plane. As shown in FIG. 1(b), a film 3 is formed by means of chemical vapor deposition. The film 3 covers the film-forming surface 1a of the sintered body 1 and the exposed surface 2a of the filling material 2.

Figure 2:
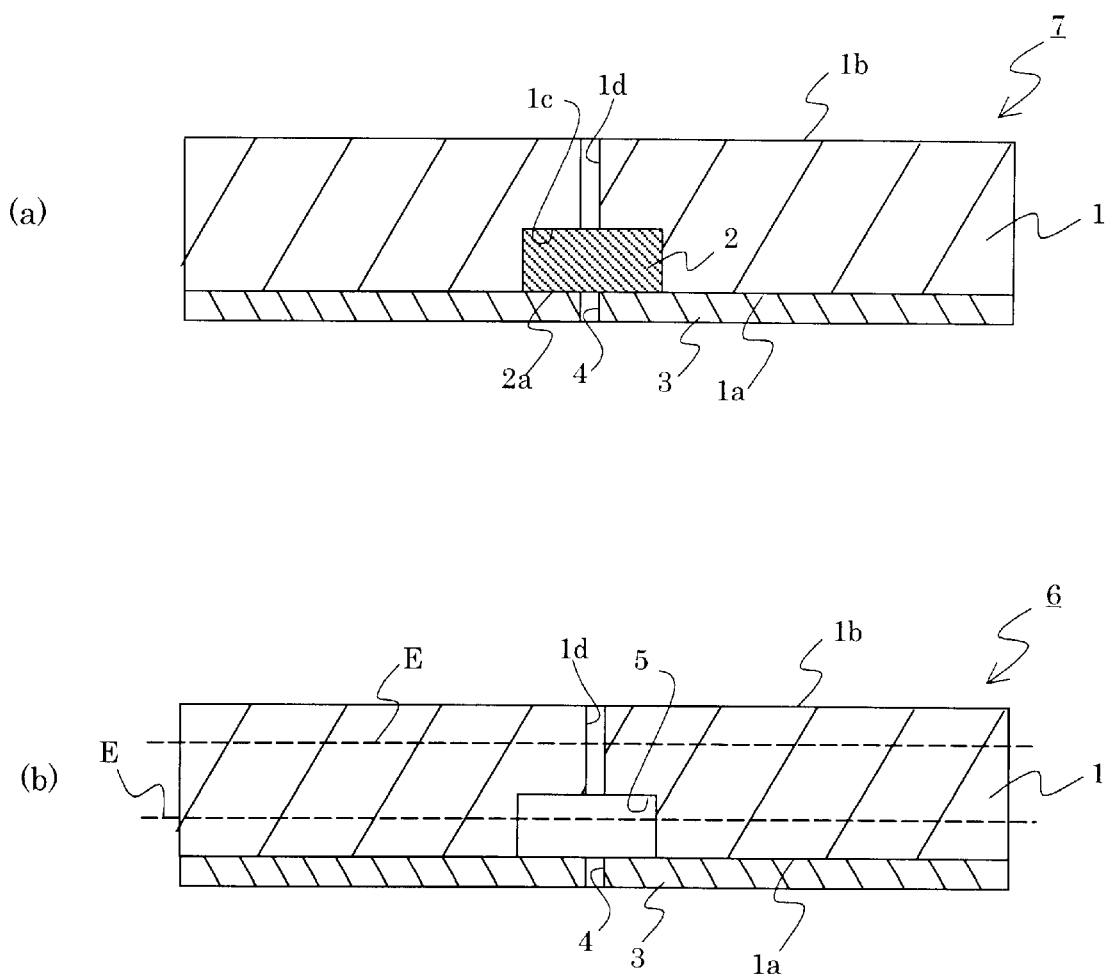
FIG. 2(a) is a cross sectional view schematically showing a laminate 7 in which communicating holes 1d and 4 are formed.
FIG. 2(b) is a cross sectional view schematically showing a ceramic laminated article 6.

As shown in FIG. 2(a), a communicating hole 4 is formed in the film 3. The hole 4 is in communication with the atmosphere outside of the film 3 and with the filling material 2 in the recess 1c. Another communicating hole 1d is formed in the sintered body 1. The hole 1d is in communication with atmosphere outside of the sintered body 1 and with the filling material 2 in the recess 1c. An assembly (ceramic laminate) 7 is obtained after forming the communicating holes 4 and 1d as described above.

As shown in FIG. 2(b), the laminate 7 is then subjected to a heat treatment so that the filling material 2 in the recess 1c is fired and dissipated through the holes 4 and 1d to the outside space of the laminate. As a result, the recess 1c is left as a hollow 5 to provide a ceramic laminated article 6. The hollow 5 is defined and surrounded by the sintered body 1 and the film 3.

The ceramic laminated article 6 has a dense ceramic film 3 formed by chemical vapor deposition so as to secure resistance against a corrosive substance by the film 3. At the same time, the hollow 5 is defined and surrounded with the film 3 and sintered body 1 and is in communication with the outside of the laminated article through the communicating holes 4 and 1d. It is thereby possible to supply a fluid through the hollow 5 so that the fluid may be diffused into the hollow 5. The planar shape of the hollow 5 is substantially same as that of the recess 1c. The planar shape of the recess 1c may be designed without a particular limitation and variously changed, and that of the hollow 5 may also be variously changed. It is therefore possible to diffuse and supply a fluid at a desired position through the hollow 5 by properly designing the planar shape of the hollow 5. In particular, it is possible to disperse and supply a fluid over a wider area by supplying the fluid through the hollow 5, compared with a ceramic laminated article without the hollow 5.

Further, the present invention provides a novel process for forming the hollow 5 defined and surrounded by the ceramic film 3 and sintered body 1.

In a preferred embodiment, the laminated article according to the invention is a gas supply member for supplying a gas from the side of the ceramic sintered body to the side of the ceramic film. In the member, communicating holes are formed in the sintered body and the ceramic film, respectively, so that the gas may be supplied through the holes and hollow. The article 6 of FIG. 2(b) may be used as such gas supply member. In this case, it is possible to supply a fluid over a wide area on the side of the film 3.

In a preferred embodiment, in the article of FIG. 2(b), the communicating hole 1d is provided in the sintered body 1 and the communicating hole 4 is not provided in the film 3. In this case, a fluid may be supplied from the communicating hole 4 and flow through the hollow 5 inside of the film 3, with the fluid not discharged through the film 3 to the outside of the film. In this case, the fluid flows into the hollow 5 and a corrosive substance flows into the outside space of the film 3. The fluid and corrosive substance are separated only with a very thin film 3. It is thereby possible to improve the efficiency of thermal exchange of the fluid in the hollow and the corrosive substance. Addition to this, it is possible to further improve the efficiency of the thermal exchange by increasing the area of the hollow 5.

According to the present invention, the kind of a ceramic material for the sintered body is not particularly limited. The material is preferably one that is effective for preventing the peeling of the dense ceramic film 3 formed by chemical vapor deposition from the sintered body due to the difference of thermal expansion coefficients. The sintered body is preferably one of the following:

(1) A sintered body having a composition containing not lower than 90 percent of silicon carbide and a relative density of not lower than 90 percent;

(2) A porous sintered body having a composition containing not lower than 90 percent of silicon carbide and a relative density of 56 to 90 percent;

(3) A mixed sintered body of silicon carbide and a silicon metal;

(4) A nitride ceramic such as silicon nitride, aluminum nitride and sialon; and (5) A ceramic composed of an aluminum compound such as alumina and aluminum nitride.

The shape of the recess (or hollow) formed in the sintered body is not limited. For example, it is required that the cross sectional area of the hollow 5 is larger than that of each of the communicating holes 1d and 4, when the article is cut along planes "E" parallel with the ceramic film 3, as shown in FIG. 2(b). The cross sectional area of the hollow is preferably not smaller than 5 times, and more preferably not smaller than 10 times, that of each hole 1d or 4. Further, the ceramic laminated article may have an elongate shape. In this case, the recess (hollow) may preferably have an elongate shape extending in the longitudinal direction of the article, for supplying a fluid uniformly in the longitudinal direction of the article. In this case, the aspect ratio of the cross section of the hollow is preferably not smaller than 3, and more preferably not smaller than 5, when the article is cut along planes "E" parallel with the ceramic film 3.

The depth of the recess is not particularly limited. The depth is preferably not smaller than 0.3 mm to reduce the pressure loss of the flow of a fluid.

The material of the ceramic film is not particularly limited. The material is preferably one of the following from the viewpoint of providing resistance against a corrosive substance:

(1) A ceramic composed of a silicon compound such as silicon carbide and silicon nitride;

(2) A nitride ceramic such as silicon nitride, aluminum nitride, sialon or the like; and (3) A ceramic composed of an aluminum compound such as alumina, aluminum nitride or the like.

In a particularly preferred embodiment, the ceramic film is made of silicon carbide ceramics. The silicon carbide ceramic is preferably a dense material having a high theoretical density and a high purity. Most preferably, the purity of the silicon carbide film is not lower than 99.9999 percent.

Conditions applied in forming the ceramic film by means of chemical vapor deposition may be those known in the art. The following conditions are preferred for forming a film of, for example, silicon carbide.

A sintered body is fixed in a furnace. At a film-forming temperature, hydrogen gas is supplied into the furnace for a while, and hydrogen gas and a carbon source compound then flow for a while. The flow of the carbon source compound is then stopped and hydrogen and a silicon source compound are introduced into the furnace for a short time period. Hydrogen, a silicon source compound and a carbon source compound are supplied into the furnace to form a silicon carbide film. The silicon source compound is preferably $SiCl_4$, $SiHCl_3$, $SiCl_2H_2$ or $SiH_4$, and the carbon source compound is preferably $CH_4$, $C_2H_6$ or $C_3H_8$. The film-forming temperature may be varied depending on a CVD system used, for example 1200 to 1280° C.

The communicating hole $1d$ may be formed in the sintered body before the reaction process of the chemical vapor deposition. Alternatively, the hole $1d$ may be formed in the sintered body 1 after the ceramic film 3 has been formed. The communicating holes $1d$ and 4 may be formed by machining.

When the article according to the present invention is used as an anti-corrosive member against a specific corrosive substance, the substance may be one the following:
(a) Solution containing the ions of a strong acid such as hydrofluoric acid, nitric acid, hydrochloric acid, or nitrohydrochloric acid; and
(b) A reactive and highly corrosive gas such as $CF_4$, $NF_3$, $ClF_3$, HF, HCl, $Cl_2$ or the like.

When a fluid flows in the hollow in the inventive article, such a fluid may be, for example, one of Ar, $H_2$, $N_2$, $O_2$, He, air or the like. When the fluid is to be contacted with the corrosive gas, the fluid is selected based on the reactivity of the fluid and the corrosive gas.

Figure 3:
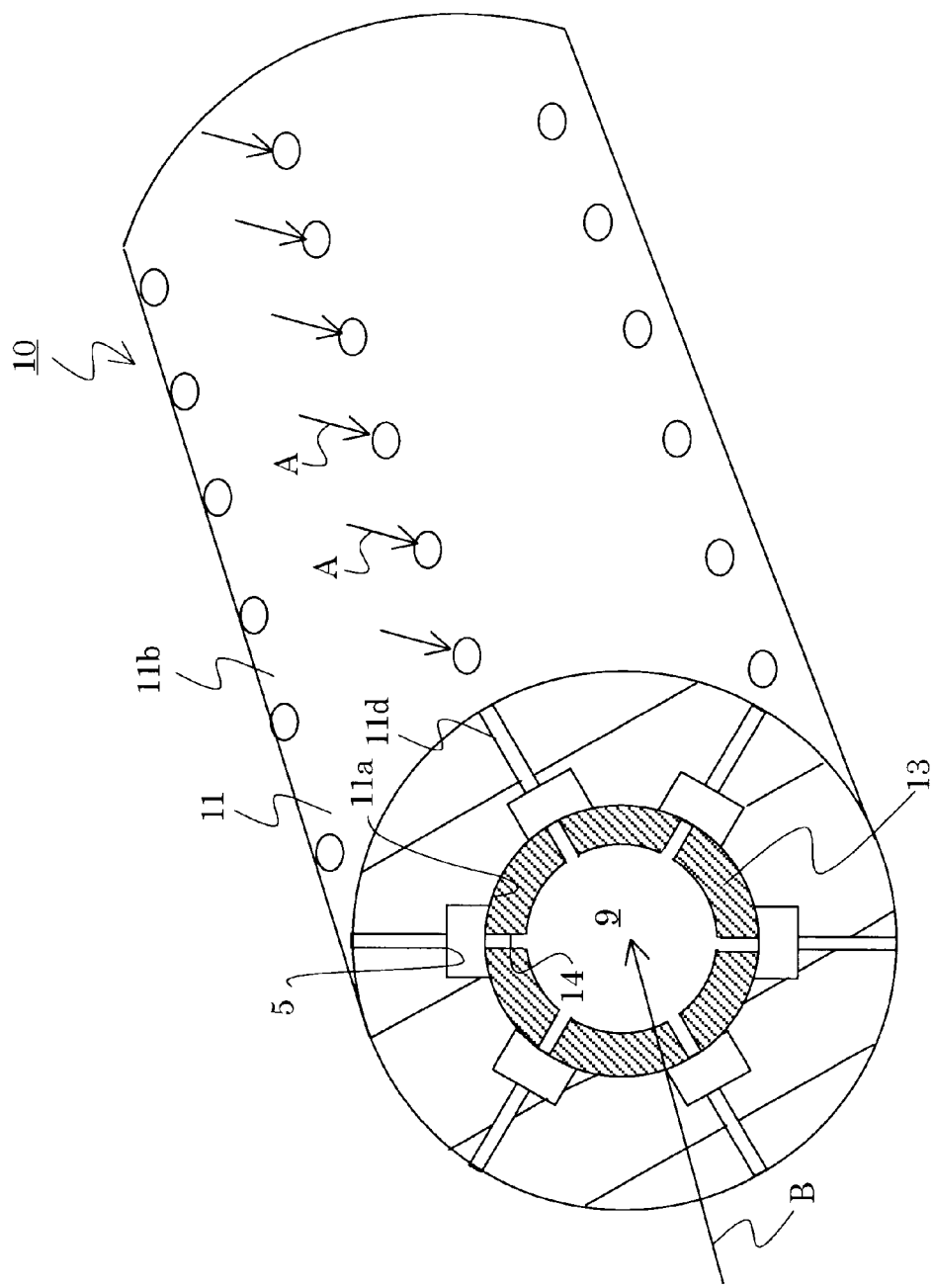
FIG. 3 is a perspective (partly broken) view schematically showing a discharge tube 10 according to one embodiment of the present invention.

FIG. 3 shows a discharge tube 10 for discharging a corrosive gas at a high temperature from a CVD system. The discharge tube 10 has a cylindrical ceramic sintered body 11 at its outermost portion. A ceramic film is not to be formed on an outer surface 11$b$ of the cylindrical sintered body 11. A ceramic film 13 is formed on the inner wall surface (film-forming surface) 11$a$ of the sintered body 11. A space 9 is formed inside of the ceramic film 13. Hollows 5 are formed at predetermined positions on the side of the surface 11$a$ of the sintered body 11. Each hollow 5 is in communication with the atmosphere outside the discharge tube 11 through communicating holes 11$d$ and the inner atmosphere in the space 9 of the discharge tube through communicating holes 14.

Figure 4:
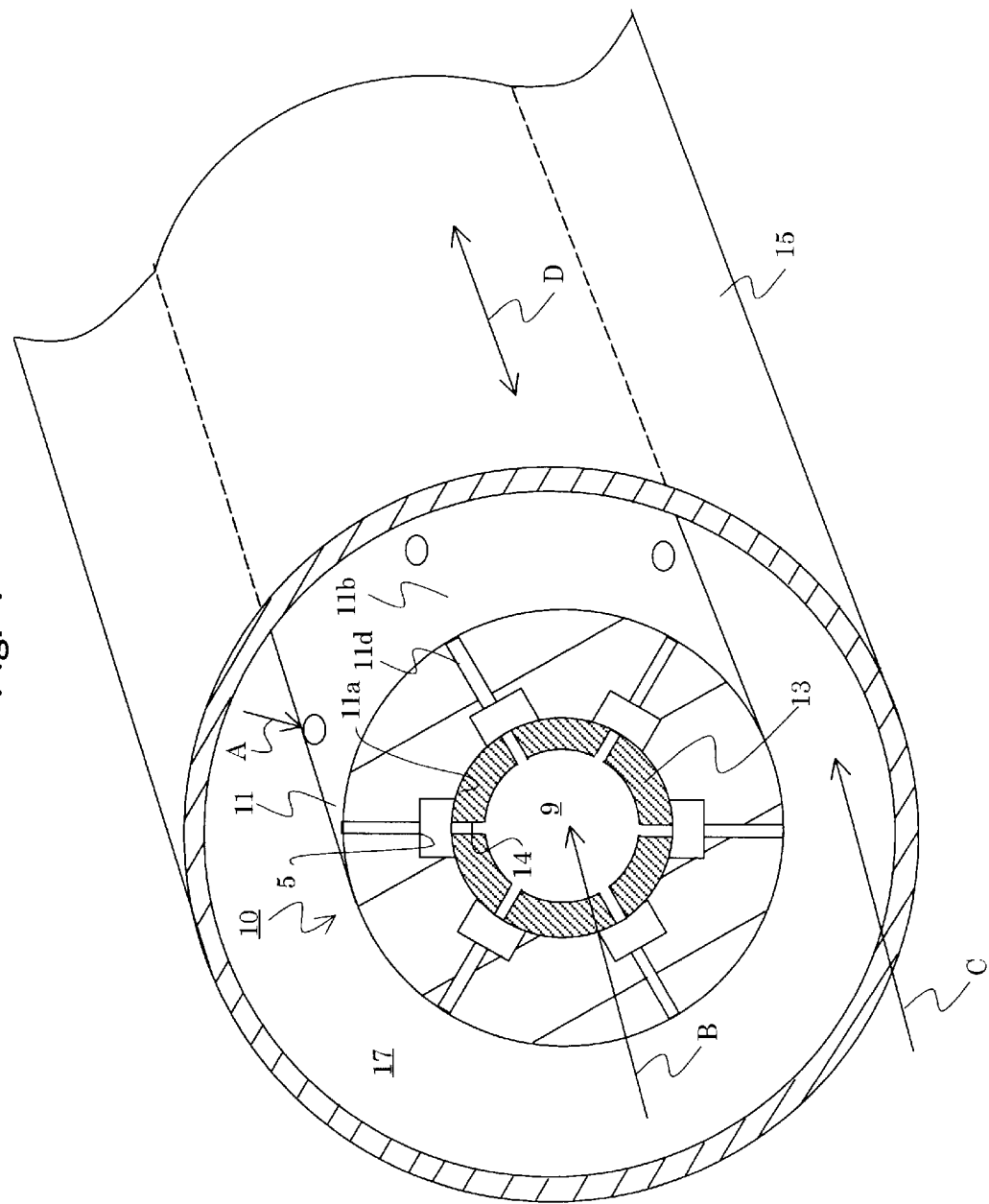
FIG. 4 is a perspective view (partly broken) schematically showing the discharge tube 10 fixed inside of an outer tube 15.

The discharge tube 10 is inserted inside of an outer tube 15, as shown in FIG. 4. Exhaust gas from a CVD system flows into the gas passage 9 as shown in an arrow "B." An inert gas flows in an outside space 17 of the discharge tube 10 as an arrow "C". The inert gas is supplied into each hollow 5 through each communicating hole 11$d$ as an arrow "A." Each hollow 5 is elongated in the longitudinal direction (a direction shown by an arrow "D") of the discharge tube 10. The inert gas then flows into the hollow 5 in the longitudinal direction and flows into the gas passage 9 through the inner communicating holes 14. When an inert gas at room temperature is supplied into the outer space 17, the inert gas flows into the hollows 5 and then flows in the longitudinal direction in each hollow 5. The inert gas flowing in the hollow 5 and the exhaust gas at a high temperature flowing in the gas passage 9 are subjected to thermal exchange to reduce the temperature of the exhaust gas.

The process according to the present invention and preferred embodiments of the ceramic laminated article will be described further in detail.

The method for providing the filling material in the recess of the ceramic sintered body is not particularly limited and is preferably one of the following:
(1) A ceramic shaped body is sintered to obtain a ceramic sintered body. The surface of the sintered body is then processed to form a recess. The recess may be formed by a process including but not limited to machining, laser working, and wet or dry etching processes. The filling material is then provided in the recess; or
(2) Ceramic powder and a filling material are integrated and sintered as one body to provide a ceramic sintered body integrated with the filling material. The sintered body is then processed to expose the surface of the filling material so that the surface of the filling material and the surface of the sintered body together form a flat plane. At this stage, the filling material is provided in the recess of the sintered body. The surface of the filling material and the surface of the sintered body may be processed by a method including but not limited to machining, laser working, and wet or dry etching processes.

The filling material is preferably able to preserve a specified shape during a chemical vapor deposition process. Such a material is preferably a powder or solid material of carbon, resin, paper or fiber.

The filling material may have an actual carbon ratio of not lower than 50 percent after thermal decomposition during chemical vapor deposition. Further, the filling material may be thermally deformed during chemical vapor deposition. It is therefore preferred to mechanically fix the filling material to the sintered body using a fixing member such as a pin, a bolt or the like. Such a fixing member is preferably made of a material which may be decomposed under an oxidizing atmosphere as in the case of the filling material. The material of the fixing member is most preferably carbon.

In a preferred embodiment, the filling material is a porous body. In this case, the filling material may be dissipated and removed in a relatively short time period during heat treatment to minimize the damage to the ceramic laminated article. The most preferred filling material is a carbon foil.

In a preferred embodiment, the ceramic shaped body and the filling material are subjected to a pressure sintering process to provide a ceramic sintered body. It is thereby possible to improve the adhesion of the filling material onto the sintered body after the film is formed and to prevent the partial lift of the filling material from the surface of the sintered body. As a result, it becomes possible to form the ceramic film uniformly on the surfaces of the filling material and sintered body so as to prevent the peeling and crack formation in the film.

FIGS. 5 to 8 mainly relate to the process (2) described above. FIGS. 5($a$) to 6($c$) show each of the stages of the method for producing a ceramic laminated article 6A according to one embodiment of the present invention.

A molded body 16 having the shape shown in FIG. 5($a$) is prepared. The molded body 16 is made of a material substantially same as the filling material. In the present example, the molded body 16 is composed of a plate-shaped portion 16a and a ring-shaped portion 16b protruding from the plate-shaped portion 16a. Ceramic powder is filled directly onto the plate-shaped and ring-shaped portions 16a and 16b to obtain a shaped body. The shaped ceramic powder is integrated with the molded body 16 as 17 shown in FIG. 5(b). An integrated body of the shaped ceramic powder and molded body 16 is then sintered to obtain an integrated sintered body, as shown in FIG. 5(b), having a ceramic sintered body 17. The plate-shaped portion 16a of the molded body 16 is removed by processing to obtain a sintered body 1A as shown in FIG. 5(c). A ring-shaped recess 1c is formed on the side of the film-forming surface 1a of the sintered body 1A. A filling material 2A is thus filled and set in the recess 1c.

A film 3 is formed on the film-forming surface 1a and on the filling material 2A by means of chemical vapor deposition, as shown in FIG. 6(a) as described above. As shown in FIG. 6(b), communicating holes 4 are formed in the film 3 and communication holes 1d are formed in the sintered body 1A to obtain an assembly to be processed (ceramic laminate) 7A. The laminate 7A is then subjected to heat treatment, as described above, to dissipate and remove the filling material 2A to form hollows 5A, as shown in FIG. 6(c).

Preferably, when the molded body 16 and ceramic powder are sintered as an integrated body, they are subjected to pressure sintering. It is thereby possible to improve the adhesion of the sintered body 1A and filling material 2A. The pressure sintering process in not limited and includes hot pressing and hot isostatic pressing.

FIGS. 7(a) to 8(d) show each of the stages of another method for producing the ceramic laminated body 6A.

A molded body 16 shown in FIG. 7(a) is prepared. The molded body 16 is made of a material substantially same as the filling material described above. In the present example, the molded body 16 has a plate-shaped portion 16a and a ring shaped portion 16b protruding from the plate-shaped portion. A ring-shaped filling material 18 is then set and fixed on the ring-shaped protrusion 16b of the molded body 16. The method for fixing the ring-shaped filling material includes but is not limited to adhesion and soldering. In the present example, the molded body 16 is used for shaping ceramic powder and not as the filling material described above.

Ceramic powder is filled on the plate-shaped portion 16a and on the ring-shaped portion 16b to obtain a shaped body. The shaped ceramic powder, the molded body 16 and the filling material 18 are sintered as an integrated body to obtain an integrated sintered body shown in FIG. 7(b). 17 is a ceramic sintered body. As shown in FIG. 7(c), the sintered body 17 is machined to dotted lines 20 so as to remove the plate-shaped portion 16a and the ring-shaped protrusion 16b. A sintered body of FIG. 8(a) is thus obtained. A ring-shaped recess 1c is formed on the side of the film-forming surface 1a of the sintered body 1A. A ring-shaped filling material 2B is filled in the recess 1c.

A film 3 is formed on the film-forming surface 1a and on the surface of the filling material 2B by means of chemical vapor deposition, as shown in FIG. 8(b) as described above. Communicating holes 4 are formed in the film 3 and communicating holes 1d are formed in the sintered body 1A as shown in FIG. 8(c) to obtain an assembly (ceramic laminate) 7B. The laminate 7B is then subjected to heat treatment to dissipate and remove the filling material 2B to form hollows 5A as shown in FIG. 8(d).

According to the process, the molded body 16 itself is not used as the filling material and a separate filling material is joined with the molded body 16 to leave the filling material in the integrated sintered body. This process is advantageous when a porous material or a material of a low mechanical strength is applied as the filling material. The reasons are as follows. When the whole of the molded body 16 is formed of a porous material or a material of a low mechanical strength, the deformation of the molded body 16 may be considerable during the pressure sintering process. Contrary to this, the deformation of the molded body 16 made of a material of a relatively high strength is small during the pressure sintering. When the filling material is a porous material or a material of a low strength, the deformation of the filling material may be thus prevented by the underlying molded body 16, by joining the filling material to the molded body before the pressure sintering. It is thus possible to stabilize the shape and dimension of the integrated sintered body during pressure sintering.

EXAMPLES

Example 1

A ceramic laminated article 6 was produced according to the process described above referring to FIGS. 1 and 2. The silicon carbide sintered body 1 had a length of 100 mm, a width of 200 mm, and a thickness of 10 mm. The sintered body 1 had a linear expansion coefficient of $4.7 \times 10^{-6}/°$ C. A recess 1c with a depth of 2 mm was formed in the sintered body 1 and carbon 2 was filled in the recess 1c.

The sintered body 1 was contained and set in a furnace for chemical vapor deposition. The furnace was evacuated and then replaced with argon gas. The temperature in the furnace was then elevated from room temperature to a film-forming temperature (1400° C.). During the temperature ascending (heating) step, argon gas was supplied as a carrier gas. Just after the temperature in the furnace reached the film forming temperature, hydrogen alone was first supplied for 10 minutes to 1 hour, and then a mixed gas of hydrogen and methane flowed for 1 to 10 minutes. The supply of methane was then terminated and a mixed gas of hydrogen and silicon tetrachloride flowed for 5 to 10 minutes. Then, a mixed gas of hydrogen and silicon tetrachloride flowed for 10 hours to form a silicon carbide film 3 having a thickness of 0.8 mm. The pressure in the CVD furnace was set at 200 Torr. During the film forming step, the ratio of (a molar amount of silicon tetrachloride)/(a molar amount of methane) was adjusted at 1.3, and the ratio of (a molar amount of hydrogen)/(a molar amount of silicon tetrachloride) was adjusted at a range of 3.5 to 4.5. The communicating hole 1d was formed in the sintered body and communicating hole 4 was formed in the film 3 to obtain an assembly 7.

The assembly was then contained in an electric furnace and subjected to a heat treatment at 1000° C. for 50 hours to dissipate and remove carbon 2 to provide a laminated article 6.

Example 2

A ceramic laminated article was produced according to the method described above referring to FIGS. 7(a) to 8(d).

Concretely, the molded body 16 shown in FIG. 7(a) was prepared. The plate-shaped portion 16 had a thickness of 10 mm and a diameter φ of 100 mm. The ring-shaped protrusion 16b had a width of 5 mm and a thickness of 2 mm.

Further, two foils each made of graphite and having a thickness of 1 mm were prepared. The two foils were laminated and compressed at a bearing stress of 200 kg/cm² using a 400 ton press to roll the laminated foils. The laminated foils had a thickness of about 1 mm after the compressing and rolling. The foil was then cut to obtain a ring-shaped filling material 18 having a width of 5 mm. The ring-shaped filling material 18 was mounted on and joined with the ring-shaped protrusion 16b of the molded body 16 with a paper bond, as shown in FIG. 7(a).

The molded body 16 and filling material 18 were then set in a metal mold. In the mold, the filling material was mounted on the molded body. Silicon carbide powder was filled on the filling material and molded body and compressed at a bearing stress of 200 kg/cm² to obtain a shaped body. The shaped body was removed from the metal mold together with the molded body 16 and filling material 18. The shaped body was set in a small furnace for hot pressing, and then subjected to hot pressing at a maximum temperature of 2200° C., with a holding time at the maximum temperature for 2 hours, and a bearing stress of 200 kg/cm². The integrated sintered body 1A shown in FIG. 7(c) was thus obtained.

The molded body 16 and filling material 18 were ground to remove them by a thickness of 500 μm to obtain the sintered body 1A shown In FIG. 8(a). In the sintered body 1A, the ring-shaped recess 1c had a depth of about 500 μm and a thickness of 5 mm.

The surface of the sintered body 1A and the surface of the filling material 2B were purified by an alcohol. The sintered body 1A was then contained and fixed in a furnace for chemical vapor deposition. The furnace was evacuated and the atmosphere was then replaced with argon gas. The temperature in the furnace was then elevated from room temperature to a film-forming temperature (1400° C.). During the temperature ascending (heating) step, argon gas was supplied as a carrier gas. Just after the temperature in the furnace reached the film forming temperature, hydrogen alone was first supplied for 10 minutes to 1 hour, and a mixed gas of hydrogen and methane flowed for 1 to 10 minutes. The supply of methane was then terminated and a mixed gas of hydrogen and silicon tetrachloride flowed for 5 to 10 minutes. A mixed gas of hydrogen and silicon tetrachloride then flowed for 10 hours to form a silicon carbide film 3 having a thickness of about 1 mm. The pressure in the CVD furnace was set at 200 Torr. Four communicating holes 1d were formed in the sintered body 1A and four communicating holes 4 were formed in the film 3 to obtain an assembly 7B. Each of the communicating holes had a diameter φ of 3 mm.

The assembly 7B was then contained in an electric furnace and subjected to a heat treatment at 900° C. for 72 hours to dissipate and remove carbon 2 to provide a laminated article 6A.

The present invention provides a ceramic laminated structure for improving the resistance against a corrosive substance and to diffuse and supply a fluid over a larger area of the structure.

The present invention further provides a novel process of producing a structure having a ceramic film with a hollow formed inside of the film, by means of chemical vapor deposition.

The present invention has been explained referring to the preferred embodiments. However, the present invention is not limited to the illustrated embodiments which are given by way of examples only, and may be carried out in various modes without departing from the scope of the invention.

What is claimed is:

1. A ceramic laminated article comprising a ceramic sintered body and a ceramic film formed on said sintered body by chemical vapor deposition, wherein said ceramic laminated article has a hollow portion formed therein defined by said sintered body and said ceramic film, and an opening in communication with said hollow portion and with an environment outside said article.

2. The article of claim 1, wherein said ceramic film comprises a silicon carbide film.

3. The article of claim 1, said ceramic laminated article being a member for supplying a gas, wherein said opening comprises a first hole formed in said sintered body and a second hole formed in said ceramic film, so that a gas may be supplied through said first hole and through said hollow portion and discharged from said second hole to the environment outside said article.

4. The article of claim 1, wherein said ceramic film is formed on a surface of said sintered body that is exposed to a corrosive substance.

5. The article of claim 1, wherein said sintered body has an elongate shape and said hollow portion extends in the longitudinal direction of said sintered body.

6. A ceramic laminate comprising a ceramic sintered body having a recess formed therein, a filling material filled in said recess and a ceramic film formed on said sintered body by chemical vapor deposition so as to cover said filling material, wherein said laminate comprises an opening formed in said laminate and communicating with said recess and with an environment outside of said laminate.

7. The laminate of claim 6, wherein said filling material comprises carbon.

8. The laminate of claim 6, wherein said filling material comprises a porous material.

9. The laminate of claim 7, wherein said filling material comprises a carbon foil.

10. The laminate of claim 6, wherein said sintered body is obtained by pressure sintering an integrated body of a ceramic shaped body and said filling material.

* * * * *